United States Patent [19]

Brennen

[11] Patent Number: 5,319,534

[45] Date of Patent: Jun. 7, 1994

[54] SERIES-PARALLEL ACTIVE POWER LINE CONDITIONER UTILIZING REDUCED-TURNS-RATIO TRANSFORMER FOR ENHANCED PEAK VOLTAGE REGULATION CAPABILITY

[75] Inventor: Michael B. Brennen, Pittsburgh, Pa.

[73] Assignee: Westinghouse Electric Corp., Pittsburgh, Pa.

[21] Appl. No.: 106,850

[22] Filed: Aug. 16, 1993

[51] Int. Cl.$^5$ .................... H02M 5/458; H02M 1/12
[52] U.S. Cl. ........................................ 363/40; 363/98; 323/207
[58] Field of Search ............... 363/39, 40, 97, 98, 363/131, 132; 323/207

[56] References Cited

U.S. PATENT DOCUMENTS 3,825,814  7/1974  Pelly .
4,241,395  12/1980  Stacey et al. ................... 363/39

Primary Examiner—Emanuel T. Voeltz
Attorney, Agent, or Firm—R. P. Lenart

[57] ABSTRACT

The present invention provides an improved active power line conditioner which achieves a significant improvement in peak voltage regulation capability when compared with a similarly-sized device of the prior art. Enhanced peak voltage regulation capability is achieved by reducing the number of turns on the transformer winding connected to the series inverter. As a result, the AC regulation voltage induced across the transformer primary and added to or subtracted from the AC supply voltage will be capable of achieving higher peak levels of short duration. When a reduced-turns-ratio transformer is utilized according to the invention, variations of the AC supply voltage which are within the sinusoidal regulation range of a prior art active power line conditioner having a similarly-sized transformer, the output voltage will remain sinusoidal. When, however, the input voltage variation is outside of this sinusoidal regulation range, the reduced-turns-ratio transformer will create a peaking but nonsinusoidal AC output voltage. This allows rejection of higher magnitude input voltage disturbances of short duration.

8 Claims, 3 Drawing Sheets

SERIES-PARALLEL ACTIVE POWER LINE CONDITIONER UTILIZING REDUCED-TURNS-RATIO TRANSFORMER FOR ENHANCED PEAK VOLTAGE REGULATION CAPABILITY

BACKGROUND OF THE INVENTION

1. Field of the Invention

The present invention relates to active power line conditioners which are utilized to regulate the quality of electrical energy delivered from an electrical energy source to an electrical load. More particularly, the invention relates to a series-parallel active power line conditioner (APLC) which utilizes a reduced-turns-ratio transformer to achieve significant improvements in peak voltage regulation capability.

2. Description of the Prior Art

Electric supply networks are increasingly being exposed to the consequences of nonlinear loads, such as data processing equipment, numerical controlled machines, variable speed motor drives, robotics, medical apparatus and communication equipment. Such loads draw nonlinear pulse-like currents instead of the sinusoidal currents drawn by linear loads (i.e., resistors, inductors and capacitors). These nonlinear currents flow through the source impedance, thus causing distortion of the AC line voltage.

This voltage distortion may produce a number of undesired effects. For example, sensitive loads connected to the network may experience operational difficulties. Additionally, the RMS current supplied by the source increases due to the presence of harmonics in the pulse-like currents. These harmonic currents may significantly increase $I^2R$ losses in interposing transformers.

Another problem which may have significant effects on many types of electrical equipment is the occurrence of temporary sags in the AC line voltage. For example, many types of electrical equipment utilize a power supply input stage which converts the AC line voltage to DC voltage utilizing a full wave rectifier connected across one or more large filter capacitors. In normal operation, the filter capacitor recharges with each peak of the rectified line voltage. It is only during this peak that the load is actually drawing current from the electrical supply network. When the rectified line voltage is lower than the voltage level on the filter capacitors, the rectifier diodes will prevent current from flowing. If, however, the AC line voltage does not maintain an adequate peak-to-peak value, these filter capacitors will not be able to maintain their required peak charge levels. As a result, operation of equipment incorporating the rectified capacitive power supply may be affected.

The effects of many of these problems can be mitigated through the use of power electronic devices known as active power line conditioners. Such devices typically comprise one or two switching inverters arranged in a series, parallel, or series-parallel configuration. The inverters are controlled (generally by pulse width modulation (PWM) techniques) to effect a flow of current between a DC energy storage element and the AC supply lines to which they are connected. Such devices are shown and described in U.S. Pat. Nos. 4,651,265 and 3,825,815, which are incorporated herein by reference.

When a single inverter is used, this current may consist of the harmonic and ripple currents required by the load. In a series-parallel configuration, two inverters are arranged to share a common DC link. In this arrangement, the inverters may cooperate to effect a transfer of real power between the source or load and the DC link. This may be helpful to insure that the load continually sees ideal current and voltage characterisrics.

The series inverter in a series-parallel APLC is typically coupled to the AC supply line via a coupling transformer. The series inverter applies a voltage of selected magnitude and polarity to the secondary winding of the transformer, which produces an AC regulation voltage on the primary winding of the transformer. This AC regulation voltage bucks or boosts (i.e., is added to or is subtracted from) the AC supply voltage to maintain the AC output voltage seen by the load at a regulated nominal value. The parallel inverter of the series-parallel APLC may operate as an active filter to supply real and reactive currents to the load as needed as well as cooperating with the series inverter to effect real power transfer.

The voltage regulation capability of a series-parallel active power line conditioner is given in terms of a rated buck/boost voltage range. While the line voltage magnitude stays within the rated buck/boost range, the output voltage stays generally constant and sinusoidal at the nominal value. Typically, the rated buck/boost range of an active power line conditioner is expressed as a percentage of the nominal output voltage. Generally, such range is selected to fall between $\pm 10\%$ to $\pm 25\%$ of the nominal output voltage. (The voltage buck/boost range tends to be symmetrical due to symmetry of the series inverter power circuit.)

When the supply voltage sinks below the rated boost range of the APLC, however, the output voltage tends to also be dragged down. Thus, the voltage seen by the various loads connected to the electrical supply network will fall below the nominal value. As a result, the quality of power delivered to these loads is no longer insured. This is particularly true in the case of loads having rectified capacitive inputs, since the filter capacitors may not be able to obtain their peak charge level. Additionally, transient voltage sags or surges may exceed the selected rating of the APLC on a statistical basis.

In order, therefore, to provide the greatest assurance of power quality to loads supported by the series-parallel APLC, it is desirable for the device to have as large buck/boost regulation range as is practical. The weight and cost, however, of many of the APLC components are proportional to the regulation range. As such, an APLC with a higher regulation range would be expected to be larger and more expensive than a similar device with a smaller regulation range. This may tend to negatively affect the commercial viability of such equipment. The installation of a larger coupling transformer to support excessive input voltage sags would also have double iron losses that would adversely affect overall efficiency.

SUMMARY OF THE INVENTION

The present invention provides an improved active power line conditioner which achieves a significant improvement in peak voltage regulation capability when compared with a similarly-sized device of the prior art. Instead of increasing the size of the coupling transformer as has been the practice in the past when increased regulation range is desired, the present invention may utilize the same transformer core of the lower regulation range. Enhanced peak voltage regulation capability is achieved by reducing the number of turns on the transformer winding connected to the series inverter. The voltage of the series inverter, when applied to the secondary of the reduced-turns ratio transformer, results in larger primary voltages to support the output peak voltage.

When a reduced-turns-ratio transformer is utilized according to the invention, variations of the AC supply voltage which are within the linear regulation range of a prior art active power line conditioner having a similarly-sized transformer will result in the output voltage remaining sinusoidal. When, however, the input voltage variation is outside of this linear regulation range, the reduced-turns-ratio transformer will create a peaking but nonsinusoidal AC output voltage. This peaking voltage will permit rectified capacitive loads to maintain peak charge during supply voltage variations more severe than could be maintained according to the prior art. Additionally, better regulation is achieved of transient swells and sags of limited duration.

DETAILED DESCRIPTION OF PRESENTLY PREFERRED EMBODIMENTS

Figure 1:
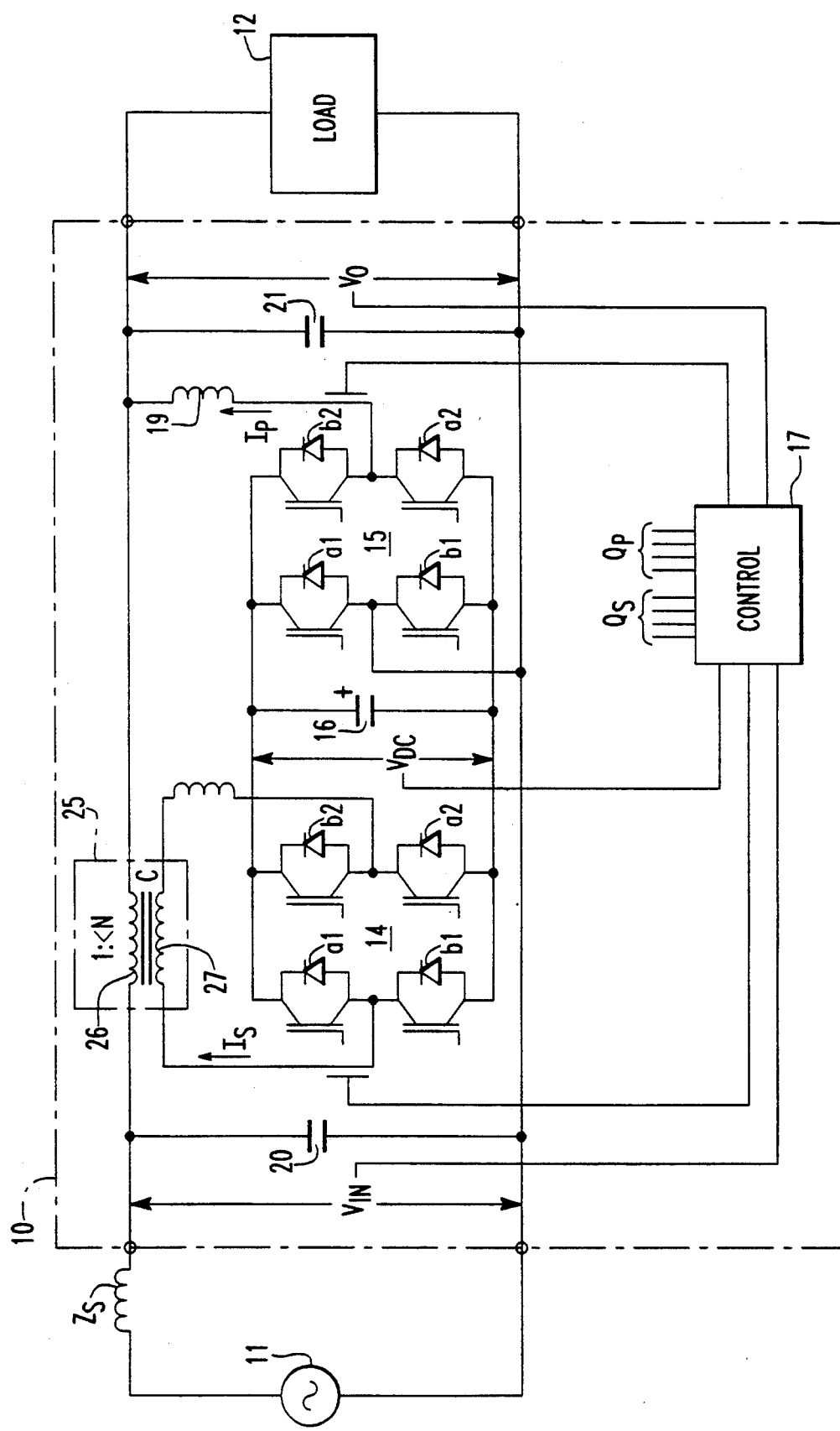
FIG. 1 is a schematic representation of an improved active power line conditioner constructed in accordance with the present invention.

FIG. 1 illustrates an active power line conditioner (APLC) 10 constructed in accordance with the invention. As shown, APLC 10 is connected interposing an electrical energy source 11 supplying an electrical load 12. Electrical energy source 11 includes source impedance $Z_S$, which is primarily inductive in nature. APLC 10 is a series-parallel device having a series inverter 14 and a parallel inverter 15 interconnected by a shared DC link. A storage capacitor 16 is connected across DC terminals of inverters 14 and 15 and functions as a DC energy storage element. Instead of capacitor 16, an inductor may also be used for this purpose. It is desirable to maintain the voltage across capacitor 16 at an essentially constant value.

Inverters 14 and 15 each include two pairs of switching devices a1, a2 and b1, b2 which are operated in a complementary manner by control 17. Control 17 receives inputs from appropriate sensors within APLC 10 which may provide information regarding the following: AC input voltage $V_{in}$, AC output voltage $V_O$, DC link voltage $V_{DC}$, AC series inverter current $I_s$ and AC parallel inverter current $I_p$. Based on this information, control 17 develops appropriate gating signals (respectively denominated as $Q_s$ and $Q_p$) to deliver regulated power to load 12 at fundamental frequency. Preferably, control 17 operates switches a1, a2 and b1, b2 according to PWM techniques.

Series inverter 14 (which here includes an inductor 18) is coupled in series with electrical energy source 11 to apply an AC regulation voltage to input voltage $V_{in}$ in the proper phase and magnitude such that output voltage $V_o$ is regulated. Parallel inverter 15 (which here includes an inductor 19) is generally connected across load 12 to source or sink line current as necessary to provide harmonic currents to the load as well as ripple filtering. In order that parallel inverter 15 will be able to easily source or sink line current as desired, the DC voltage $V_{DC}$ across capacitor 16 should be maintained at a level slightly higher than the peak of the nominal value of output voltage $V_o$. Because DC voltage Vhd DC may otherwise tend to be depleted due to switching and conduction losses within APLC 10, parallel inverter 15 is also controlled to draw an appropriate amount of real power from the AC supply line. Preferably, the link control has a relatively slow response to avoid interaction between series inverter 14 and parallel inverter 15. Capacitors 20 and 21 are provided to filter switching harmonics generated by the switching action of inverters 14 and 15, respectively.

Series inverter 14 provides the AC regulation voltage for buck/boost regulation of the AC line voltage via coupling transformer 25. Transformer 25 includes a first, or primary, winding 26 which is serially connected in the AC supply line between source 11 and load 12. A second, or secondary, winding 27 of transformer 25 is connected across AC terminals of series inverter 14. Transformer 25 may have a magnetically permeable core C of prior art dimensions and characteristics as will be explained below.

In accordance with the prior art, the coupling transformer is designed such that the AC regulation voltage provided across the transformer primary remains sinusoidal throughout the rated regulation range of the APLC. For example, consider a prior art APLC rated to provide sinusoidal buck or boost of ±20% for a nominal AC line voltage of 120 volts. In this case, the transformer of the prior art would be configured to provide a maximum sinusoidal voltage of 24 volts. Thus, for values of $V_{in}$ as low as 96 volts, the value of the AC output voltage $V_o$ will remain at 120 volts.

The turns ratio of prior art coupling transformers has been chosen to have a nominal value generally defined as follows:

Nominal Turns Ratio = $T_p$:$T_s$ $T_s = (T_p * V_{SEC})/V_{reg}$ where: $T_p$ is the number of turns of the primary winding, $T_s$ is the number of turns of the secondary winding; $V_{reg}$ is the desired maximum sinusoidal AC regulation voltage; and $V_{SEC}$ is the maximum AC voltage which may be applied to the transformer secondary ($V_{SEC}$ has a peak value generally equal to $V_{DC}$).

Thus, in the above example of a ±20% linear regulation range, the nominal turns ratio will be 1:5. The rated regulation range has dictated the characteristics and configuration of the transformer core. Particularly, the transformer core C has been configured such that saturation would generally not occur during sinusoidal variation in the flux. However, to minimize the overall size of core C, the saturation flux level would be approached as the flux varied through its maxima and minima.

If, however, according to devices of the prior art, the value of the AC input voltage $V_{in}$ falls below the rated sinusoidal regulation range, the AC output voltage $V_o$ will also sag with a value equal to the sagging $V_{in}$ plus the maximum voltage provided across the transformer primary. In the above example, for instance, if $V_{in}$ drop of 80 volts, $V_o$ will be equal to this 80 volts plus the 24 volts provided by the APLC. This 104 volts total may be inadequate to maintain the peak charge level required by rectified capacitive power supplies within the load. As a result, the operation of load equipment may be affected as discussed above.

The present invention provides a greater peak level than that attainable with the prior art by lowering the number of turns of winding 27 below that which would nominally be expected. As discussed above, a prior art APLC having a ±20% linear regulation range would be expected to have a coupling transformer with a 1:5 nominal turns ratio. In other words, the secondary winding has five times the number of turns as the primary. According to the invention, it has been found that reducing the number of turns of winding 27 while maintaining core C will produce some unexpected and advantageous results. Specifically, irrespective of the decreased turns ratio, the output voltage of APLC 10 will stay sinusoidal up to the rated linear regulation range as before. With the decreased turns ratio, however, the output voltage $V_o$ can be maintained at its nominal value during a portion of the voltage cycle, thus allowing higher transient voltage levels. As a result, filter capacitors in rectified capacitive power supplies will be able to maintain their peak charge level during more severe voltage sags than with a similarly-sized APLC of the prior art. Additionally, transient spikes in the AC line voltage can be rejected to a greater degree.

For example, consider the above exemplar of a ±20% rated regulation range. The nominal turns ratio of 1:5 may be decreased to one-half the nominal value, or 1:2.5. In this case, voltage $V_{reg}$ can be maintained during the first and third quarter cycles of each input voltage cycle for voltage sags of up to 40% the nominal value of the AC line voltage. Apart from appropriate current scaling to reflect the reduced turns ratio, control changes are generally not necessary to implement the teachings of the invention.

Figure 2:
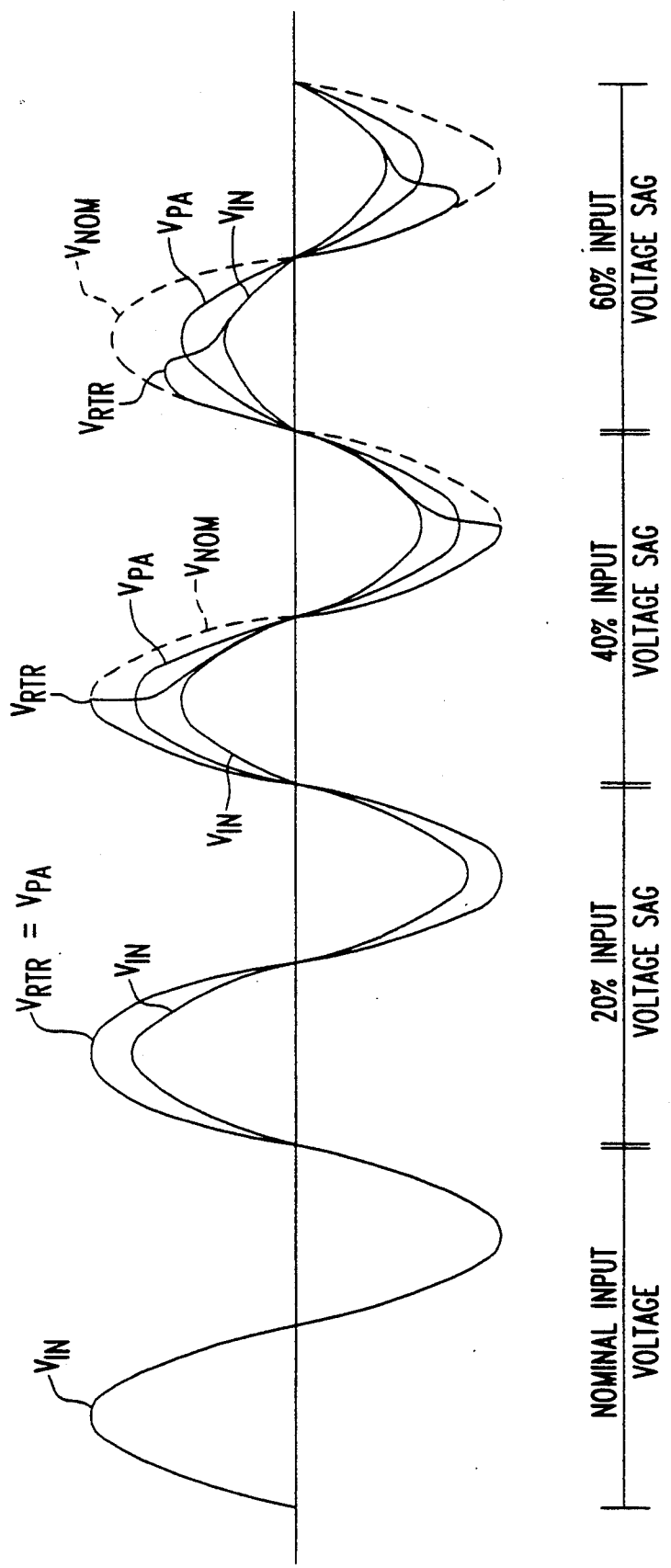
FIG. 2 is a plot of voltage regulation capability of the invention in comparison with the prior art for various degrees of sag appearing in the supply voltage.

The results obtainable with the present invention are best understood with reference to FIG. 2. There, four full cycles of a hypothetical input voltage $V_{in}$ are illustrated being regulated according to the prior art and the teachings of the present invention for the given example in which a turns ratio of one-half the nominal value is provided. During each cycle, the input voltage $V_{in}$ is allowed to sag by an additional 20%. Therefore, during the second cycle, $V_{in}$ is 80% of the nominal value $V_{nom}$. Similarly, during the third cycle, $V_{in}$ is 60% of $V_{nom}$. During the fourth input cycle, $V_{in}$ is 40% of $V_{nom}$.

Figure 3:
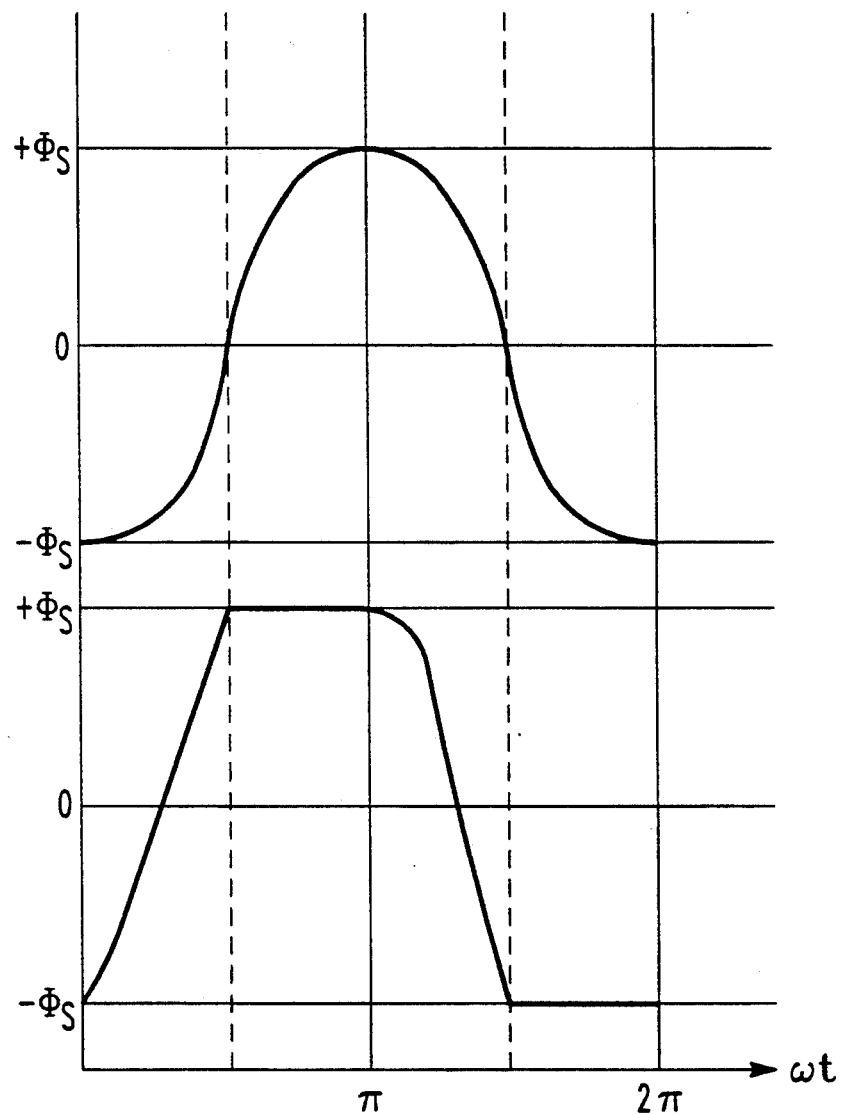
FIG. 3 is a comparative plot of the change in flux level within the core of the coupling transformer during one cycle of voltage applied to the secondary winding of the transformer in the case of the nominal turns ratio of the prior art and the reduced turns ratio of the invention.

As can be seen in the second cycle, the output voltage $V_{RTR}$ provided according to the present invention will remain sinusoidal and equal to the voltage $V_{PA}$ which would be obtainable according to prior art practice. During the third and fourth cycles, however, it can be seen that voltage $V_{RTR}$ will achieve peak values significantly higher than $V_{PA}$. The capability by which transformer 25 is able to attain the higher peak voltage levels according to the invention is best understood with reference to FIG. 3. The top half and bottom half of FIG. 3 respectively illustrate flux variation within core C as would occur according to the prior art and the present invention for the given example. According to the prior art, it was considered undesirable for flux within core C to exceed the positive or negative saturation levels, $+\Phi_s$ and $-\Phi_s$. As discussed above, however, it was also considered important that core C be made as compact as possible for the nominal turns ratio in order to reduce manufacturing costs and the overall size of the equipment. Therefore, during one cycle of AC voltage applied to the transformer secondary, the flux level would typically vary in the prior art between a level near $-\Phi_s$ and $+\Phi_s$.

According to the present invention, however, the turns ratio is reduced while maintaining core C. Normally, a reduction of the turns ratio would be accompanied by an increase in core size to accommodate the additional flux. If core C is retained, however, the flux in core C will attempt to increase linearly to a higher sinusoidal level. While the flux will be incapable of obtaining these higher levels due to the saturation limits of the core C, the voltage induced on the secondary will increase because, according to Lenz's law, the induced electromotive force is proportional to the greater rate of change of the flux.

At saturation, the flux level will stop changing, thus accounting for the sharp dropoff of $V_{RTR}$ seen in FIG. 2. When transformer 35 saturates, the current limited series inverter 14 will operate at the limit current and zero (i.e. saturated) voltage until transformer 25 desaturates in the next consecutive half cycle. While output voltage $V_o$ will not be sinusoidal during these excessive sags, it will be quasi-sinusoidal. For many of the nonlinear loads, this will be sufficient to maintain the desired peak charge levels. Additionally, transient spikes and sags in voltage $V_{in}$ can be rejected to a greater degree than before.

It can thus be seen that the present invention provides an improved active power line conditioner which is capable of achieving higher transient buck/boost regulation capability with components of that similar size. To ensure that higher peak voltages are maintained for a sufficient duration while giving adequate peak levels, the number of secondary turns should preferably be at least 50% of the nominal value.

While a presently preferred embodiment of the invention has been described and illustrated, it is to be distinctly understood that the invention is not limited thereto but may be otherwise variously embodied and practiced within the scope of the following claims.

I claim:

1. An improved active power line conditioner for electrical connection interposing an electrical energy source and an electrical load, said active power line conditioner including a transformer having a preselected core configuration, a first winding of said transformer serially connectable between said electrical energy source and said electrical load, a second winding of said transformer electrically connected to a series inverter of said active power line conditioner, said first and second windings of said transformer generally related by a nominal first-to second turns ratio, and an energy storage element electrically connected between said series inverter and a parallel inverter of said active power line conditioner, wherein the improvement comprises:

said transformer, while having said preselected core configuration, having an altered first-to second turns ratio wherein said second winding has an altered number of turns which is a lower multiple of a number of turns of said first winding than a nominal multiple thereof according to said nominal first to-second turns ratio.

2. The improved active power line conditioner of claim 1 wherein said lower multiple is at least 50 percent of said nominal multiple.

3. The improved active power line conditioner of claim 1 wherein said lower multiple is approximately fifty percent lower than said nominal multiple.

4. Apparatus for regulating AC supply voltage supplied by an AC source to an electrical load at a predetermined frequency, said apparatus comprising:

a transformer having a magnetic core, a first winding and a second winding;

said first winding serially connectable between said AC source and said electrical load;

second winding voltage means connected to said second winding for selectively applying an AC secondary voltage, $V_{SEC}$, thereacross to produce an AC regulation voltage on said first winding;

said first winding and said second winding having a reduced first-to second turns ratio with respect to a nominal first-to second turns ratio determined generally as follows:

Nominal Turns Ratio $= T_p:T_s$ $T_s = (T_p * V_{SEC})/V_{reg}$ where: $T_p$ is the nominal number of turns of the first winding, $T_s$ is the nominal number of turns of the second winding; and $V_{reg}$ is the desired maximum sinusoidal AC regulation voltage;

control means operatively connected to said sensing means and said second winding voltage means for controlling said AC regulation voltage to selectively provide buck and boost of said AC line voltage; and said magnetic core configured to have a saturation flux level such that saturation generally will not occur when said AC line voltage is within a sinusoidal regulation range of said apparatus and saturation generally will occur when said AC line voltage is not within said sinusoidal regulation range of said apparatus.

5. The device of claim 4 wherein a number of turns of said secondary winding is at least 50 percent of a number of turns of said secondary winding at said nominal first-to-second turns ratio.

6. The device of claim 4 wherein said reduced first-to-second turns ratio is generally one-half said nominal first-to-second turns ratio.

7. The device of claim 4 wherein said second winding voltage means comprises the combination of a series inverter and a parallel inverter interconnected by a DC energy storage element.

8. A method of regulating AC line voltage at a nominal value in an electrical distribution network including an AC source supplying an electrical load, said method comprising:

(a) providing a transformer having a primary winding and a secondary winding related by a turns ratio, said transformer further having a magnetically permeable core capable of saturation if voltage applied to said secondary winding exceeds a preselected secondary saturation voltage;

(b) serially connecting said primary winding of said transformer between said AC source and said electrical load;

(c) sensing a voltage supplied by said AC source;

(d) applying a secondary voltage less than said preselected maximum voltage to said secondary winding when said AC supply voltage is less than said nominal value but greater than said nominal value minus a primary voltage induced on said primary winding when said preselected secondary saturation voltage is applied to said secondary voltage; and (e) applying a secondary voltage greater than said preselected maximum voltage to said secondary winding when said AC supply voltage is less than said nominal value minus the primary voltage induced on said primary winding when said preselected secondary saturation voltage is applied to said secondary voltage.

* * * * *